US012130175B1

(12) United States Patent
Valdez et al.

(10) Patent No.: US 12,130,175 B1
(45) Date of Patent: Oct. 29, 2024

(54) METHOD OF USING CROWD-SOURCED ECHO LOCATION PINGS TO DETECT FIBER LOCATIONS USING DISTRIBUTED ACOUSTIC SENSING

(71) Applicant: FRONTIER COMMUNICATIONS HOLDINGS, LLC, Dallas, TX (US)

(72) Inventors: John Valdez, Copper Canyon, TX (US); Erwin Wardojo, McKinney, TX (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 18/738,936

(22) Filed: Jun. 10, 2024

(51) Int. Cl.
*G01H 9/00* (2006.01)
*G01V 8/24* (2006.01)
*G01D 5/353* (2006.01)

(52) U.S. Cl.
CPC .............. *G01H 9/004* (2013.01); *G01V 8/24* (2013.01); *G01D 5/35361* (2013.01)

(58) Field of Classification Search
CPC ....... G01H 9/004; G01V 8/24; G01D 5/35361
See application file for complete search history.

(56) References Cited

U.S. PATENT DOCUMENTS

2020/0199999 A1\* 6/2020 Cooper .................... G01V 1/46

\* cited by examiner

*Primary Examiner* — Tri T Ton
(74) *Attorney, Agent, or Firm* — MARSHALL, GERSTEIN & BORUN LLP

(57) ABSTRACT

A system for locating optical fiber includes a vehicle's computing device transmitting an acoustic signal and its location, an optical fiber transmitting light signals, an optical detector detecting reflected light due to the acoustic signal, and a server analyzing the reflected light to determine the fiber's location. A method involves receiving a reflected light signal at a computing device, analyzing its properties to identify an acoustic signal's properties, comparing these to a known audio signature emitted from a vehicle, and determining the fiber's location based on the identified vehicle's location. Another method includes a vehicle's computing device transmitting an acoustic signal, determining the vehicle's location, and transmitting this location to a server to determine the optical fiber's location based on the acoustic signal's properties.

20 Claims, 5 Drawing Sheets

METHOD OF USING CROWD-SOURCED ECHO LOCATION PINGS TO DETECT FIBER LOCATIONS USING DISTRIBUTED ACOUSTIC SENSING

FIELD OF THE DISCLOSURE

The present aspects relate to systems and methods for determining the location of optical fibers, and more particularly, to techniques involving the use of acoustic signals transmitted by vehicles to facilitate the identification and location determination of optical fibers, such as by analyzing reflected light signals corresponding to acoustic signals for identifying vehicles and determining the location of optical fibers based on the location of identified vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A conventional Passive Optical Network (PON) includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

PONs have been widely adopted for their efficiency in delivering broadband services to end-users. In such networks, identifying and mapping the precise locations of optical fibers is critical for maintenance, troubleshooting, and expansion activities. Traditional methods have been employed to detect and localize faults within the optical fiber infrastructure. However, these methods often face challenges in accurately mapping the physical location of the fibers, especially when discrepancies arise due to infrastructure changes, environmental factors, or inaccuracies in existing records. These issues arise due to various factors such as fiber cuts, road moves, or boring activities.

Moreover, the integration of mobile and positioning technologies has seen limited application in enhancing the detection and mapping of optical fibers within PONs. While Global Positioning System (GPS) and other positioning sensors have revolutionized location-based services for mobile devices, their application for infrastructure mapping presents an area with significant room for improvement. The dynamic and ubiquitous nature of mobile devices could potentially offer novel approaches to infrastructure monitoring and localization, leveraging their widespread use and advanced sensing capabilities.

Given the limitations of existing methods in accurately detecting and mapping optical fibers, coupled with the potential of leveraging mobile and positioning technologies, there are therefore opportunities for improved platforms and technologies for solving the identified problems.

SUMMARY

The present techniques provide a method and system for determining the location of optical fibers within optical fiber systems by utilizing acoustic signals transmitted by vehicles. This approach leverages the interaction between acoustic signals and light signals within optical fibers to identify the location of these fibers with precision. The system includes a computing device in a vehicle, an optical fiber, an optical detector, and a server device. The computing device transmits an acoustic signal with specific properties that identify the vehicle. The computing device also transmits an indication of the vehicle's location to the server device. The optical fiber transmits light signals, and the optical detector, coupled to the endpoint of the optical fiber, detects reflected light signals caused by the acoustic signal. The server device then analyzes the properties of the reflected light signals to identify the vehicle and determine the optical fiber's location based on the vehicle's location.

One of the significant improvements introduced by the present techniques is the enhanced precision in locating optical fibers within optical fiber systems. By analyzing the properties of reflected light signals, which correspond to acoustic signals transmitted by vehicles, the system can accurately determine the location of optical fibers. This method addresses the challenge of discrepancies between the recorded and actual locations of optical fibers, which may arise due to various factors such as fiber cuts, road moves, or boring activities. The ability to detect the actual locations of fibers enhances the maintenance and management of optical networks, ensuring more reliable and efficient service delivery.

Another improvement is the system's capability to determine the distance and direction from the vehicle to the optical fiber. This is achieved by analyzing the attenuation in the reflected light signal and, in some embodiments, the angle of arrival of the reflected light signal. Such detailed analysis allows for a more precise determination of the optical fiber's location, taking into account the vehicle's location, the distance from the vehicle to the optical fiber, and the direction of the vehicle with respect to the optical fiber. This level of precision is particularly beneficial in complex network environments where optical fibers may be densely packed or in hard-to-access areas.

Furthermore, the present techniques offer a scalable solution for mapping the locations of multiple optical fibers across a wide geographic area. By employing several vehicles, each transmitting unique acoustic signals, the system can simultaneously determine the locations of multiple optical fibers. This crowd-sourced approach not only accelerates the process of locating optical fibers but also contributes to the creation of a comprehensive and up-to-date map of the optical network infrastructure. Such a map is invaluable for network planning, expansion, and troubleshooting, ultimately leading to improved network performance and customer satisfaction.

In one aspect, a system for determining a location of an optical fiber includes: (1) a computing device in a vehicle configured to (i) transmit an acoustic signal having one or more properties that identify the vehicle, and (ii) transmit an indication of a location of the vehicle to a server device; (2)

an optical fiber configured to transmit a light signal; (3) an optical detector coupled to an endpoint of the optical fiber, wherein the optical detector is configured to detect a reflected light signal corresponding to at least a portion of the transmitted light signal that is reflected due to the acoustic signal; and (4) the server device communicatively coupled to the optical detector, wherein the server device is configured to: receive an indication of the reflected light signal from the optical detector, analyze one or more properties of the reflected light signal to identify one or more properties of the acoustic signal and identify the vehicle that transmitted the acoustic signal, and determine a location of the optical fiber based on the location of the vehicle.

In another aspect, a method for determining a location of an optical fiber includes: (1) receiving, at a computing device via an optical detector optically coupled to an optical fiber, a reflected light signal having one or more properties, wherein the reflected light signal corresponds to a transmitted light signal via the optical fiber, and wherein at least a portion of the light signal is reflected due to an acoustic signal; (2) analyzing, by the computing device, the one or more properties of the reflected light signal to identify one or more properties of the acoustic signal; (3) comparing, by the computing device, the one or more properties of the acoustic signal to sounds transmitted by vehicles at known locations to identify a vehicle that transmitted the acoustic signal; and (4) determining, by the computing device, a location of the optical fiber based on a known location of the identified vehicle.

In yet another aspect, a method for transmitting an acoustic signal to determine a location of an optical fiber includes: (1) transmitting, by a computing device in a vehicle, an acoustic signal having one or more properties that identify the vehicle; (2) determining, by the computing device, a location of the vehicle when the acoustic signal is transmitted; and (3) transmitting, by the computing device, an indication of the location of the vehicle to a server device, wherein the acoustic signal reflects at least a portion of a light signal transmitted via an optical fiber for the server device to determine the location of the optical fiber based on the location of the vehicle according to one or more properties of the received portion of the light signal corresponding to the one or more properties of the acoustic signal that identify the vehicle.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

There are shown in the drawings arrangements which are presently discussed, it being understood, however, that the present embodiments are not limited to the precise arrangements and instrumentalities shown.

Figure 1:
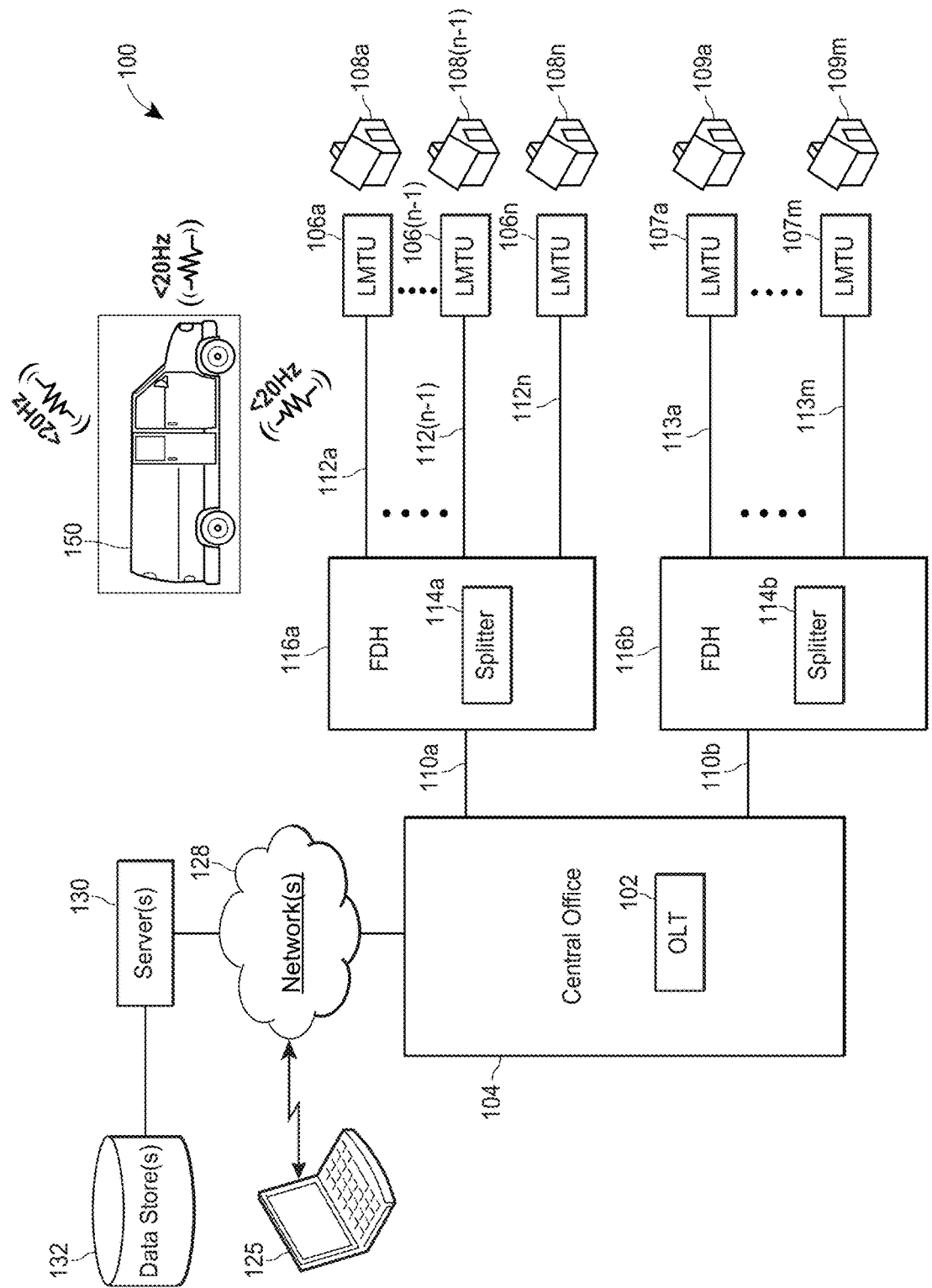
FIG. 1 is a block diagram of an example passive optical network (PON) utilizing distributed acoustic sensing (DAS) technology to detect the locations of optical fibers through acoustic signals emitted by vehicles in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide a number of advantages over existing techniques for locating optical fibers. Reference will now be made in detail to non-limiting examples, some of which are illustrated in the accompanying drawings.

The present techniques introduce a method for determining the location of optical fibers in optical fiber systems using acoustic signals transmitted by vehicles, such as automobiles and drones, within a geographic area. This approach offers significant improvements in terms of precision, scalability, and the ability to update the optical fiber network map dynamically. By addressing the technical challenges associated with locating optical fibers, the present techniques contribute to the enhancement of optical network management and the quality of service provided to end-users.

This approach may also utilize acoustic signals at subsonic frequencies, which are below the threshold of human hearing, to encode identification information for the vehicle.

These acoustic signals, characterized by their unique audio signatures, interact with the optical fibers in such a way that allows for the precise determination of the fibers' locations through the analysis of reflected light signals caused by Rayleigh scattering. By harnessing the power of acoustic signals and the principles of Rayleigh scattering, the present techniques offer a highly efficient and accurate method for detecting the locations of optical fibers.

In one example, an optical fiber system may include a PON. The present techniques may determine the location of an optical fiber within the PON using DAS. In some implementations, the optical fiber may be included within a bundle of optical fibers where at least one of the optical fibers in the bundle transmits signals within the PON. The present techniques may utilize DAS to determine the location of any of the optical fibers in the bundle. Then the locations of the other optical fibers in the bundle may be determined using the identified location of one of the optical fibers in the bundle. For example, the bundle of optical fibers may include a first optical fiber that transmits signals within the PON and a second optical fiber that transmits signals point-to-point. The present techniques may determine the location of the second optical fiber using DAS. Then the present techniques may determine the location of the first optical fiber using the location of the second optical fiber since they are in the same bundle.

While the optical fibers are referred to as part of a PON, this is merely one example for ease of illustration only. The optical fibers may be included within any suitable optical fiber system (e.g., an Active Optical Network (AON), an optical mesh network, etc.).

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units 106a, ..., 106n at respective customer premises 108a, ..., 108n. The last mile termination units 106a, ..., 106n may be located outside and/or inside the customer premises or locations 108a, ..., 108n. Each last mile termination unit 106a, ..., 106n may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110a from the OLT 102 (which is interchangeably referred to herein as an "F1 optical fiber 110a" or a "primary optical fiber 110a") serves the one or more last mile termination units 106a, ..., 106n via respective distribution optical fibers 112a, ..., 112n (which are interchangeably referred to herein as "F2 optical fibers 112a, ..., 112n" or "secondary optical fibers 112a, ..., 112n"). In the illustrated example, the first feeder optical fiber 110a is optically coupled to the plurality of last mile termination units 106a, ..., 106n via an example one-to-many optical splitter 114a which is disposed, located, implemented, etc. in an example fiber distribution hub (FDH) 116a. In some arrangements, the FDH 116a is located within a geographic area (e.g., a neighborhood) such that the customer premises 108a, ..., 108n are proximally close to the FDH 116a, and typically each of the customer premises 108a, ..., 108n and respective last mile termination units 106a, ..., 106n is disposed at a different optical distance from the FDH 116a. An "optical distance," as generally utilized herein, refers to a distance over which a light signal travels. In some implementations, the PON 100 may include optical detector(s) to detect light level signals at endpoints of the optical fibers 110a-110b, 112a-112n, and 113a-113m. The optical detector(s) may be optically coupled to endpoints of the optical fibers 110a-110b, 112a-112n, and 113a-113m. Also in some implementations, the optical detector(s) may detect reflected light signals from several ports within the central office 104 that each correspond to a different optical fiber 110a-113m.

In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110b from the OLT 102 that is optically coupled to another plurality of last mile termination units 107a-107m at respective customer premises 109a-109m via another many-to-one optical splitter 114b included in another fiber distribution hub 116b and via respective secondary optical fibers 113a-113m.

As utilized herein, the "components" of the PON 100 generally refer to the devices, nodes, and optical fibers of the PON 100. For example, the components of the PON 100 shown in FIG. 1 may include the OLT 102, the FDHs 116a, 116b, the splitters 114a, 114b, the LMTUs 106a-106n and 107a-107m, and the optical fibers interconnecting the devices or nodes, e.g., the optical fibers 110a-110b, 112a-112n, and 113a-113m.

In some scenarios, an optical terminal (e.g., the OLT 102 and/or one or more the last mile termination units 106a-106n, 107a-107m) communicates with a computing device. For example, the OLT 102 and/or the one or more LMTUs 106a-106n, 107a-107m may transmit or receive data from a computing device 125 (e.g., a laptop, a computer, a tablet, a mobile phone, etc.) associated with a service technician or other agent of the PON 100 or a computing device associated with a customer.

In some examples, the computing device 125 is located with a vehicle 150, such as a service van, truck, other automobile, or done. The computing device 125 may generate and transmit acoustic signals via a speaker in the computing device 125 or in a vehicle head unit, as described in more detail below with reference to FIG. 2. The acoustic signals have properties that encode identification information for the vehicle 150, serving as an audio signature.

The computing device 125 may include one or more processor(s) and a memory storing machine-readable instructions executable on the processor(s). The processor(s) may include one or more general-purpose processors (e.g., CPUs), and/or special-purpose processing units (e.g., graphical processing units (GPUs)). The memory may be a non-transitory memory and can include one or several suitable memory modules, such as random access memory (RAM), read-only memory (ROM), flash memory, other types of persistent memory, etc.

Additionally, the computing device 125 may include sensors, such as a positioning sensor (e.g., a Global Positioning System (GPS)), an accelerometer, an infrared sensor, a camera, a depth sensor such as a light detection and ranging (lidar) sensor, an electromagnetic sensor, etc. The computing device 125 may also include a network interface for communicating with other devices. The network interface may enable communication with other devices (e.g., the OLT 102, the last mile termination units 106a, 106n, the one or more servers 130, the computing device 125, etc.) via any suitable networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

When the computing device 125 transmits acoustic signals, within the same geographic area as the light signals in the optical fibers 110a-113m, the acoustic signals cause portions of the light signals to reflect via Rayleigh scattering. An optical detector, for example within an optical interrogator unit, detects these reflected light signals. The optical interrogator unit may be located within a server device 130 or may be communicatively coupled to the server device 130. The server device 130 and/or the optical interrogator unit analyzes the properties of the reflected light signals, such as the frequency, amplitude, and phase of the reflected light signals, to identify the corresponding audio signatures from the acoustic signals that caused the reflection.

The server device 130 may analyze the intensity or power of the reflected light at the optical detector to measure the attenuation of the signal across the optical fiber 110a-113m. The server device 130 may also determine the location within the optical fiber 110a-113m where the signal is attenuated based on the time of flight of the reflected light. The time of flight of the reflected light may be the time from when the light is transmitted until the reflected light is received at the optical detector. For example, the distance (D) between the transmitted light from one end of the optical fiber to the point on the optical fiber where the light was reflected may be proportional to the speed of light (c) and half of the time of flight (t) of the reflected light (D=c*t/2). The server device 130 may then identify the location of the point on the optical fiber where light was reflected based on the distance from one end of the optical fiber.

In some implementations, the optical detector is located within the central office 104. The optical detector may detect reflected light signals from several ports within the central office 104 that each correspond to a different optical fiber 110a-113m. Then the optical detector may transmit an indication of the reflected light signals (e.g., the properties of the reflected light signals) over the network 128 to the server device 130. The server device 130 receives the properties of the reflected light signals along with indications of the times the reflected light signals were detected and/or the times the corresponding light signals were transmitted. The server device 130 identifies the optical fiber 110a-113m corresponding to a reflected light signal based on the port where the reflected light signal is detected.

Various information and data associated with, utilized by, and/or generated by the PON 100 may be stored in the data stores 132 of the PON 100. For example, the data store(s) 132 may store locations and timestamps of vehicles 150 emitting acoustic signals and the determined locations of the optical fibers 110a-113m. The data store(s) may also store the audio signature emitted by each of the vehicles 150. For example, a first vehicle may emit a first audio signature having a first set of properties (e.g., a first frequency, amplitude, phase, and/or signal modulation). A second vehicle may emit a second audio signature having a second set of properties (e.g., a second frequency, amplitude, phase, and/or signal modulation), etc., where each audio signature is unique.

By analyzing the properties of the reflected light signals and comparing them to the stored audio signatures in the data stores 132, the server device 130 can identify the vehicle 150 that transmitted the acoustic signal from multiple vehicles transmitting acoustic signals. The server device 130 then determines the location of the optical fiber 110a-113m based on the location of the identified vehicle 150 at the time the reflected light signal was detected.

The example servers 130, optical terminals (e.g., any of the OLT 102, the last mile termination units 106a, 106n), and/or the example computing devices 125, 150 may include a processing platform capable of executing instructions to, for example, implement operations of the example methods described herein, as may be represented by the flowcharts of the drawings that accompany this description. Other example logic circuits capable of, for example, implementing operations of the example methods described herein include a field programmable gate array (FPGA), an application specific integrated circuit (ASIC), a programmable logic device (PLD), and a field programmable logic device (FPLD). The processing platform may be, for example, one or more servers, a cloud computing system, a computer, a workstation, a laptop, a mobile device (e.g., a cell phone, a smart phone, a tablet such as an IPAD™), or any other type of computing device or system.

The example processing platform includes one or more processors, one or more memories, one or more network interfaces, one or more input/output (I/O) interfaces, and/or a set of data stores, all of which are interconnected via one or more address/data bus or communication links.

The processors may be implemented using hardware, and may include a semiconductor based (e.g., silicon-based) device. The processors may be, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the processors may be a field programmable gate array (FPGA), an application specific integrated circuit (ASIC), etc. that implements operations of the example methods described herein without executing instructions.

The memories are accessible by the processors (e.g., via a memory controller). The example processors interact with the memories to obtain, for example, machine-readable instructions stored in the memories corresponding to, for example, the operations represented by the flowcharts of this disclosure. The example processors may also interact with the memories to store data, such as data formed or used during execution of machine-readable instructions. Example memories include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the processing platform to provide access to the machine-readable instructions stored thereon.

The example processing platform includes one or more communication interfaces such as, for example, the one or more network interfaces, and/or the one or more input/output (I/O) interfaces. The communication interface(s) enable the processing platform to communicate with, for example, another device, system, etc. (e.g., the OLT 102, the last mile termination units 106a, 106n, the one or more servers 130, the computing device 125, the one or more data stores 132, etc., any other database, and/or any other machine).

The example processing platform includes the network interface(s) to enable communication with other machines (e.g., the OLT 102, the last mile termination units 106a, 106n, the one or more servers 130, the computing device 125, etc.) via, for example, one or more networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

The example, processing platform includes the input/output (I/O) interface(s) (e.g., a Bluetooth® interface, a near-field communication (NFC) interface, a universal serial bus (USB) interface, a serial interface, an infrared interface, a PCI express interface, etc.) to enable the processors to communicate with peripheral I/O devices and/or other communication systems. For example, the I/O interface(s) may be used to control a light source, enable receipt of user input (e.g., from a touch screen, a keyboard, a navigation device such as mouse, touch pad, joystick or trackball, a microphone, a button, etc.) and communicate output data (e.g., visual indicators, instructions, data, images, etc.) to the user (e.g., via a display, a speaker, a printer, a communication interface, an antenna, etc.). The I/O interface(s) typically include a graphics driver card, graphics driver chip and/or graphics driver processor to drive a display when a display is present.

In some examples, the processing platform also includes, or is otherwise communicatively coupled to, a set of data stores or other data storage mechanisms (one or more of a HDD, optical storage drive, solid state storage device, CD, CD-ROM, DVD, Blu-ray disk, RAID, data storage bank, etc.). The set of data stores may include the example data stores 132.

Figure 2:
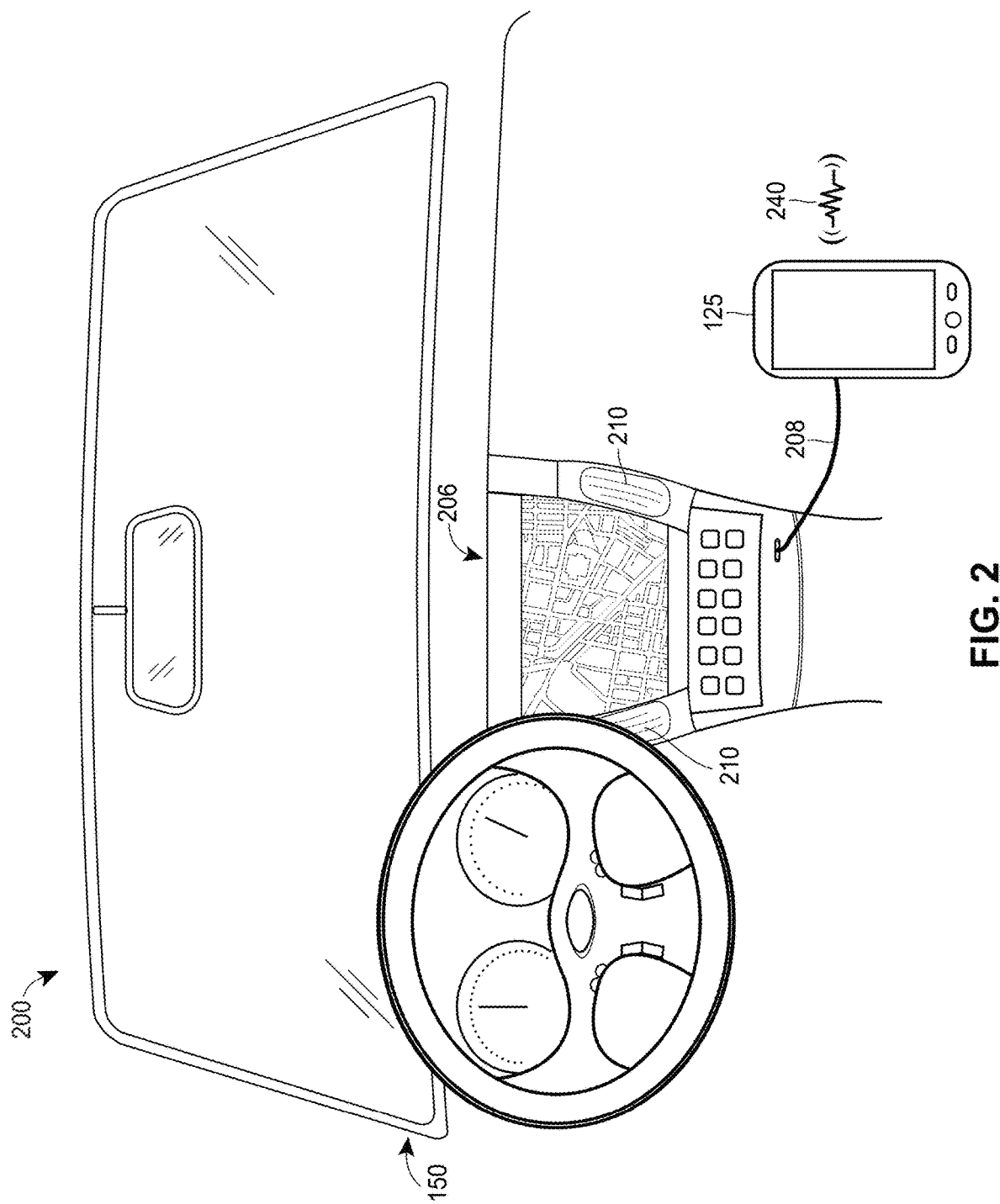
FIG. 2 illustrates an example vehicle in which the techniques of the present disclosure can be used to transmit acoustic signals.

FIG. 2 illustrates an example vehicle 150 in which the techniques of the present disclosure can be used to transmit acoustic signals. The environment 200 depicted includes a computing device 125 and a vehicle 150 equipped with a head unit 206. The computing device 125, which may be a smartphone, tablet computer, wearable device, or any other portable computing device, is communicatively coupled to the head unit 206 of the vehicle 150 via a communication link 208. This communication link 208 can be established through various means, including but not limited to, wired connections such as Universal Serial Bus (USB) or wireless connections such as Bluetooth or Wi-Fi Direct.

The computing device 125 is equipped with a specialized application for generating acoustic signals 240 with subsonic frequencies, i.e., frequencies below 20 Hz. These acoustic signals 240 are designed to include a unique audio signature that encodes identification information for the vehicle 150. The unique audio signature can be modulated in terms of frequency, amplitude, or phase over a predetermined period of time to encode the vehicle's identification information. For example, the unique audio signature may have varying amplitudes and in some instances, an amplitude of zero, over a predetermined period of time to encode the identification information.

Upon generating the acoustic signal 240, the computing device 125 may transmit the acoustic signal 240 to the vehicle's head unit 206, which then emits the acoustic signal 240 through the vehicle's speakers 210. In other implementations, the computing device 125 may emit the acoustic signal via speakers within the computing device 125. This process allows the acoustic signal, carrying the vehicle's unique identification information, to be continuously emitted as the vehicle 150 travels within a geographic area.

In addition to generating and transmitting acoustic signals 140, the computing device 125 periodically or continuously determines its location using various positioning sensors such as GPS, inertial measurement units (IMUs), accelerometers, electromagnetic sensors, or other suitable sensors. For example, the computing device 125 may determine its location based on electromagnetic (EM) data detected from the computing device 125. The computing device 125 may compare the EM data to known EM data at various locations to determine its location. In any event, the computing device 125 may determine its location using any suitable combination of GPS, IMUs, accelerometers, and electromagnetic sensors.

The computing device 125 then periodically or continuously transmits its current location along with a timestamp to the server device 130. This information is crucial for mapping the geographic area where the acoustic signals are emitted and for subsequent analysis by the server device 130 to detect the locations of optical fibers, for example in a passive optical network (PON).

It is important to note that while the vehicle 150 is illustrated as an automobile, such as a car or truck, this is merely one example. The disclosed techniques can be equally applied to other types of vehicles, including drones or any other suitable vehicles capable of traveling within a geographic area and emitting acoustic signals.

Figure 3:
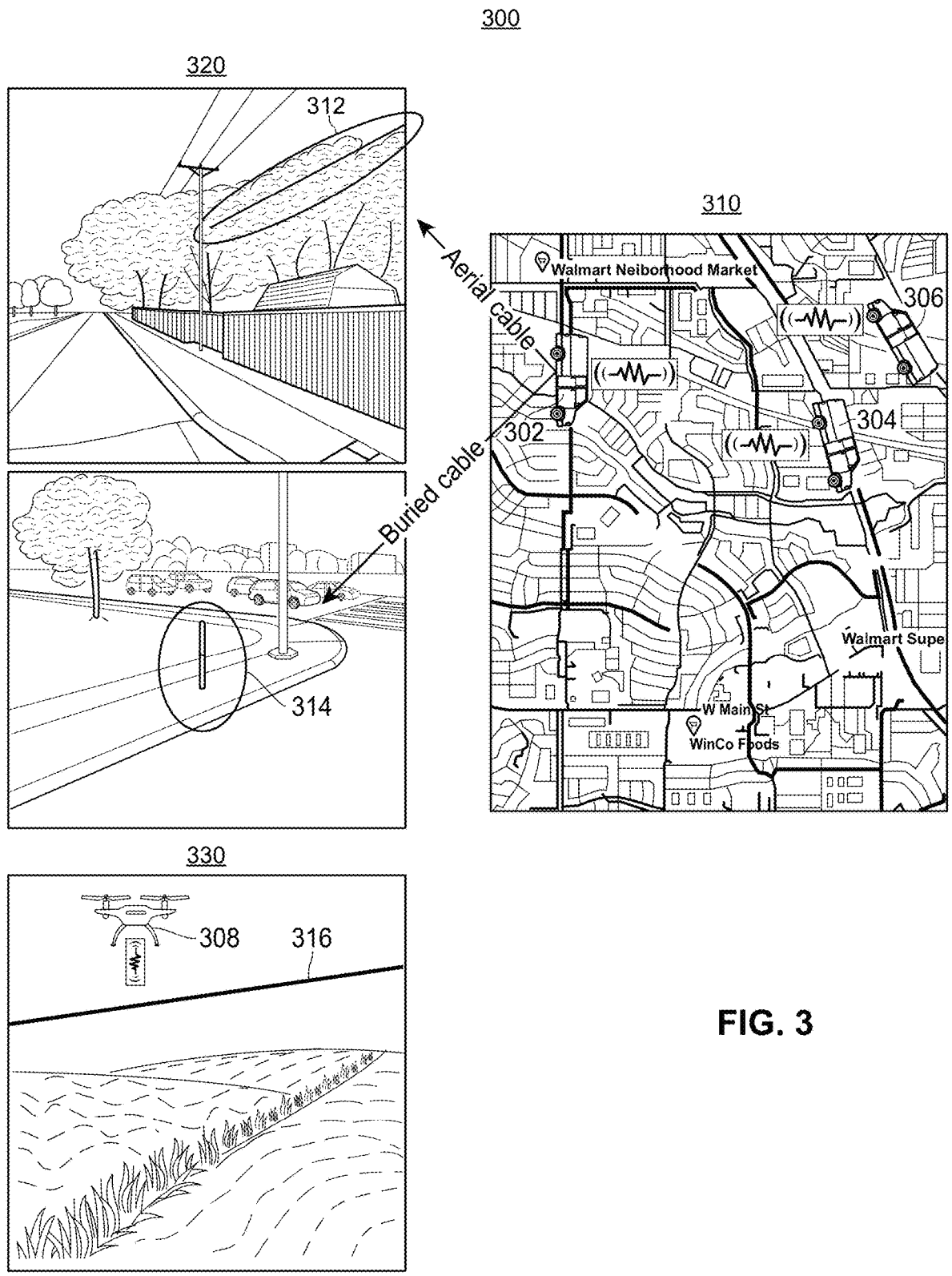
FIG. 3 illustrates a schematic diagram of vehicles at various locations on a map transmitting acoustic signals at subsonic frequencies side-by-side with a display of real-world views of optical fibers that reflect light signals based on the acoustic signals.

FIG. 3 illustrates a schematic diagram 300 of vehicles 302-308 at various locations on a map display 310 transmitting acoustic signals at subsonic frequencies side-by-side with displays 320, 330 of real-world views of optical fibers 312-316 that reflect light signals based on the acoustic signals. The vehicles 302-308, equipped with computing devices 125, emit unique acoustic signals that interact with the light signals in the optical fibers 312-316, causing portions of the light signals to reflect. These reflected light signals are detected by an optical detector, which may be included in an optical interrogator unit, allowing for the identification of the optical fiber's location based on the properties of the reflected light signal.

More specifically, Rayleigh scattering occurs when light or other electromagnetic radiation scatters off particles much smaller than the wavelength of the radiation. In the context of DAS, acoustic signals emitted by vehicles 302-308 cause minute changes in the density and refractive index of the medium surrounding the optical fibers 312-316, leading to the scattering of light signals within the fibers 312-316.

When a vehicle 302-308 emits an acoustic signal, the pressure waves from the signal propagate through the ground and interact with the optical fibers 312-316. This interaction causes localized changes in the refractive index of the fiber 312-316, leading to Rayleigh scattering of the light traveling within the fiber. The scattered light, which contains information about the acoustic signal, is then detected by the optical detector. For example, the scattered light may have the same or similar frequency and/or amplitudes as the acoustic signal.

The optical detector then provides an indication of the reflected light signal to the server device 130. The server device 130 analyzes the properties of the reflected light signal, such as frequencies, amplitudes, phases, and signal modulation of the reflected light signal, to identify the properties of the acoustic signal that caused the reflection. In some implementations, the signal modulation may encode a message that identifies a particular vehicle 302-308. For example, the signal modulation may encode a numeric sequence which uniquely identifies the vehicle 302-308.

The server device 130 may compare the properties of the reflected light signal with the known audio signatures emitted by the vehicles 302-308. For example, the first vehicle 302 may emit a first audio signature, the second vehicle 304 may emit a second audio signature, the third vehicle 306 may emit a third audio signature, and the fourth vehicle 308 may emit a fourth audio signature. The server device 130 may compare the properties of the reflected light signal with the properties of the first, second, third, and fourth audio signatures to identify the audio signature that corresponds to the reflected light signal. For example, if the server device 130 determines the properties of the reflected light signal match the properties of the first audio signature, the server device 130 may determine the acoustic signal came from the first vehicle 302.

In any event, the server device 130 may identify the vehicle that emitted the acoustic signal based on the relationship between the acoustic signal properties and the resulting changes in the reflected light signal. Distributed acoustic sensing works by continuously monitoring the backscattered light in an optical fiber 312-316 to detect vibrations or acoustic signals along the fiber. The intensity and properties of the backscattered light change in response to these vibrations, allowing for the detection and localization of acoustic events.

Accordingly, the server device 130 may determine the location of the optical fiber 312-316 based on the location of the identified vehicle 302-308 that emitted the acoustic signal. In some implementations, the server device 130 determines the location of the optical fiber 312-316 according to the location of the identified vehicle 302-308 and the distance between the identified vehicle 302-308 and the optical fiber 312-316. The server device 130 may determine the distance from the vehicle 302-308 that emitted the acoustic signal to the optical fiber based on the attenuation in the reflected light signal. The more the signal attenuates, the farther the source of the acoustic signal is from the point of detection. For example, the server device 130 may compare the power or intensity of the transmitted light signal to the power or intensity of the reflected light signal to determine the attenuation in the reflected light signal.

The server device 130 calculates the distance based on the attenuation and uses the known location of the vehicle, obtained via GPS or other positioning technologies, to determine the location of the optical fiber 312-316.

Additionally, the server device 130 may determine the particular point within the optical fiber 312-316 where the signal was reflected based on the time of flight of the reflected light. The time of flight of the reflected light may be the time from when the light is transmitted until the reflected light is received at the optical detector. For example, the distance (D) between the transmitted light from one end of the optical fiber to the point on the optical fiber where the light was reflected may be proportional to the speed of light (c) and half of the time of flight (t) of the reflected light (D=c*t/2). The server device 130 may then identify the location of the point on the optical fiber where light was reflected based on the distance from one end of the optical fiber. Accordingly, the server device 130 may determine the precise locations of each point within the optical fiber 312-316 to determine for example, the optical fiber 312-316 is positioned from northwest to southeast, the optical fiber 312-316 curves around a particular barrier, etc. In this manner, the server device 130 may generate a coordinate mapping of several points within the optical fiber 312-316.

Still further, the optical fiber systems can transmit coherent light signals of different colors or wavelengths over the optical fibers 312-316, which scatter differently based on the acoustic signals. By analyzing the angles of refraction of the different colors or wavelengths in the reflected light signal, the server device 130 can determine the direction of the vehicle 302-308 with respect to the optical fiber 312-316 or an angle of incidence. Then the server device 130 may determine the location of the optical fiber 312-316 using the location of identified vehicle 302-308, the distance between the identified vehicle and the optical fiber 312-316, and the direction of the vehicle 302-308 with respect to the optical fiber 312-316.

For example, if the server device 130 determines the coordinate location of the identified vehicle 302-308, and that the identified vehicle 302-308 is 5 m southeast from the optical fiber 312-316, the server device 130 may determine the location of the optical fiber as a location which is 5 m southeast from the coordinate location of the identified vehicle 302-308.

As mentioned above, while the vehicle may be an automobile such as a truck 302-306, the display 330 illustrates a drone 308 that emits acoustic signals that interact with the light signals in the optical fiber 316. As shown in the display 330, the optical fiber 316 may be in a geographic area which is far from any road. Therefore, a drone 308 may be used to identify the locations of optical fibers 316 which are difficult to reach with an automobile.

Figure 4:
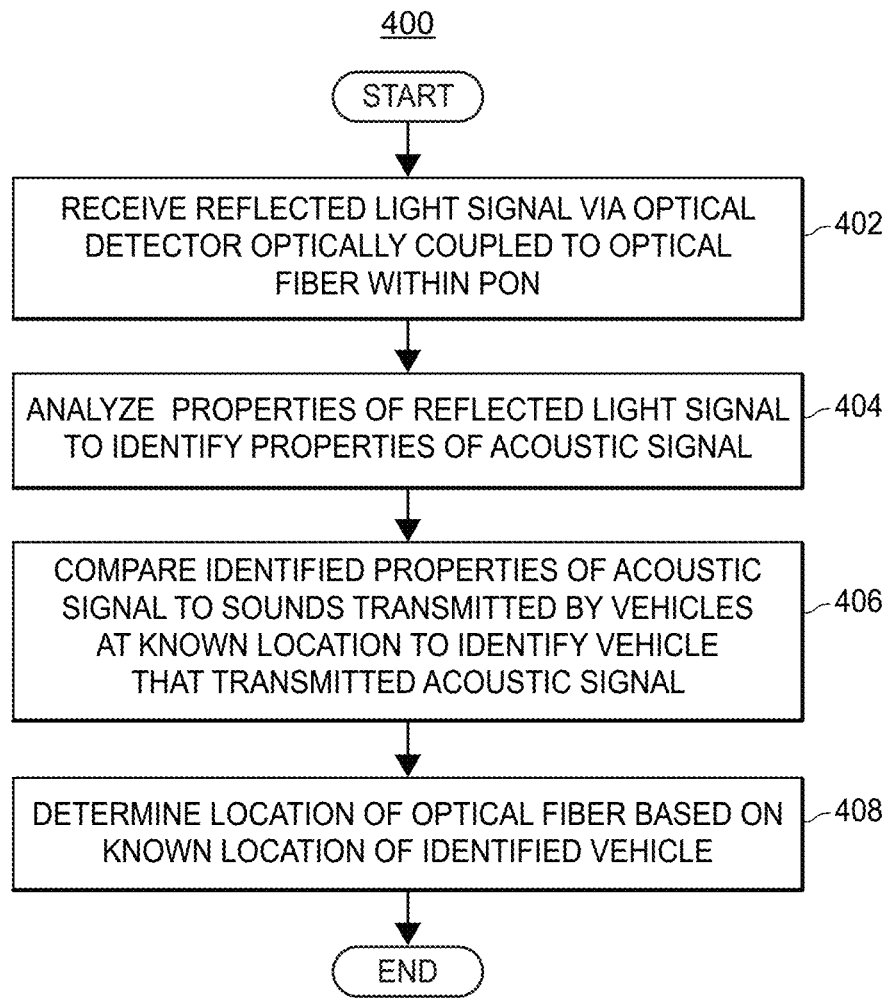
FIG. 4 illustrates a flow diagram of an example method for determining a location of an optical fiber in an optical fiber system (e.g., a Passive Optical Network (PON)), which may be implemented by the server device of FIG. 1.

FIG. 4 illustrates a flow diagram of an example method for determining a location of an optical fiber in an optical fiber system (e.g., a Passive Optical Network (PON)), which may be implemented by the server device 130 of FIG. 1.

The method begins with the server device 130 receiving a reflected light signal via an optical detector that is optically coupled to an optical fiber 110a-113m within the optical fiber system (block 402). The optical detector within the optical interrogator unit detects the reflected light signal resulting from an interaction between a transmitted light signal in the optical fiber 110a-113m and an acoustic signal emitted by a vehicle 150.

Next, the server device 130 analyzes the properties of the reflected light signal to identify the properties of the acoustic signal (block 404). This analysis involves examining the frequency, amplitude, phase, and/or signal modulation of the reflected light signal, which corresponds to the properties of the acoustic signal that caused the reflection. These properties may encode identification information for the vehicle 150. In some implementations, the optical interrogator unit within the server device 130 performs this analysis.

The server device 130 then compares the identified properties of the acoustic signal to sounds transmitted by vehicles 150 at known locations to identify the vehicle 150 that transmitted the acoustic signal (block 406). To perform the comparison, the server device 130 may retrieve audio signatures corresponding to several different vehicles from a database of audio signatures, such as the data store 132. The server device 130 obtains the set of audio signatures, each encoding identification information for a different vehicle 150, and matches the properties of the acoustic signal to these stored audio signatures.

Upon identifying the vehicle 150, the server device 130 determines the location of the optical fiber 110a-113m based on the known location of the identified vehicle 150 (block 408). In some implementations, the server device 130 retrieves the location of the identified vehicle 150 at the time when the reflected light signal was detected. The server device 130 receives locations of the vehicle 150 and corresponding timestamps, which may be transmitted by a computing device 125 within the vehicle 150, as shown in FIG. 2. The server device 130 may also determine the distance between the identified vehicle 150 and the optical fiber 110a-113m based on attenuation in the reflected light signal, and/or the direction of the vehicle 150 with respect to the optical fiber 110a-113m based on angles of refraction of different colors or wavelengths in the reflected light signal. Then the server device 130 may determine the location of the optical fiber 110a-113m based on any suitable combination of (i) the known location of the identified vehicle 150, (ii) the distance between the identified vehicle 150 and the optical fiber 110a-113m, and/or (iii) the direction of the vehicle 150 with respect to the optical fiber 110a-113m.

The optical fiber may be optically connected to an optical line terminal (OLT) via a port. The server device 130 may identify the optical fiber from which the reflected light signal is received based on the port from which the optical detector detects the reflected light signal.

The server device 130 may determine the time of the reflected light signal and compare this time to corresponding times at which the identified vehicle 150 is at known locations to identify a matching time and corresponding known location of the vehicle 150. This step ensures the precise determination of the optical fiber's location by correlating the time of the reflected light signal with the vehicle's location at that specific time.

The server device 130 may also store indications of the determined locations of each of the optical fibers 110a-113m, for example in the data store 132. More specifically, the server device 130 may store a mapping of the optical fibers and their corresponding locations. For example, the server device 130 may store and update location data for the optical fibers 110a-113m when reflected light signals are detected that match audio signatures from vehicles.

Figure 5:
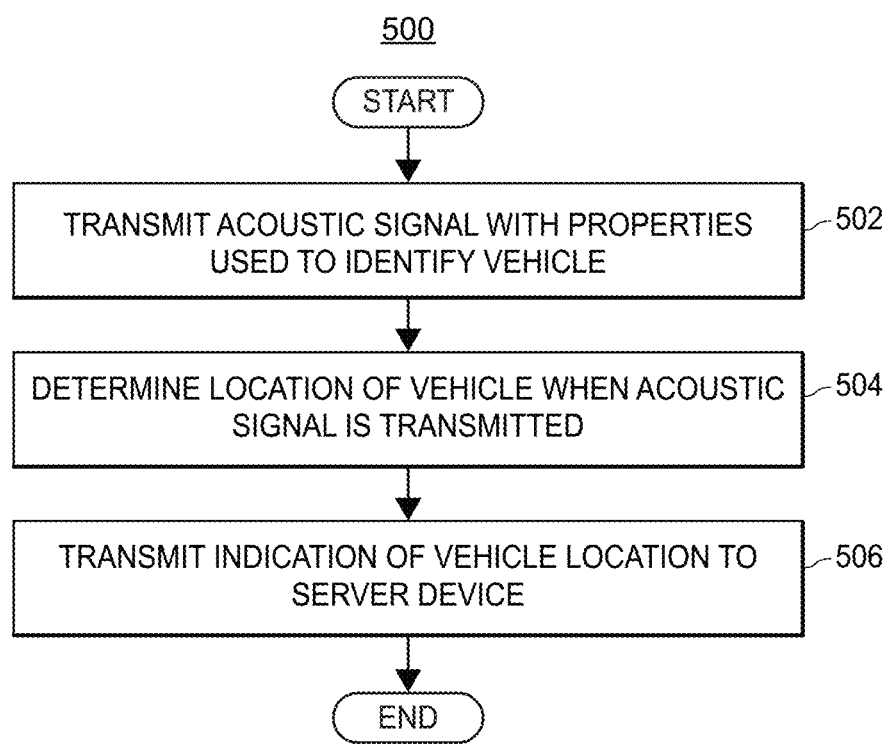
FIG. 5 illustrates a flow diagram of an example method for transmitting an acoustic signal to determine a location of an optical fiber in an optical fiber system (e.g., a Passive Optical Network (PON)), which may be implemented by the client device of FIG. 2.

FIG. 5 illustrates a flow diagram of an example method for determining a location of an optical fiber in an optical fiber system (e.g., a Passive Optical Network (PON)), which may be implemented by the computing device 125 of FIG. 2.

The method begins with a computing device 125 in a vehicle 150 (e.g., an automobile or a drone) transmitting an acoustic signal with properties that identify the vehicle 150 (block 502). In some implementations, the computing device 125 is a mobile device which generates the acoustic signal and transmits it to the vehicle's speaker system for emission. The acoustic signal's properties, including frequency, amplitude, or phase, may encode identification information for the vehicle 150. Also in some implementations, the acoustic signal is transmitted with a subsonic frequency which may be below 20 Hz. The computing device 125 may continuously transmit the acoustic signal as the vehicle 150 travels within a geographic area.

Concurrently, the computing device 125 determines the location of the vehicle 150 when the acoustic signal is transmitted (block 504). This determination is made using GPS or other positioning sensors within the computing device 125, such as IMUs, accelerometers, electromagnetic sensors, etc.

The computing device then transmits an indication of the vehicle's location to a server device 130 (block 506). This transmission includes the location of the vehicle and/or a timestamp of when the location was recorded.

The acoustic signal interacts with the optical fiber, causing at least a portion of a light signal transmitted via the optical fiber to reflect. This reflection is due to Rayleigh scattering, as described above. The optical detector detects the reflected light signal.

The server device 130 then analyzes the properties of the received portion of the light signal that corresponds to the properties of the acoustic signal. Based on this analysis, the server device 130 determines the location of the optical fiber using the location of the vehicle 150. The server device 130 may identify the vehicle 150 that transmitted the acoustic signal by comparing the properties of the acoustic signal to stored audio signatures.

Additional Considerations

The above description refers to a block diagram of the accompanying drawings.

Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

A system for determining a location of an optical fiber, the system comprising: a computing device in a vehicle configured to (i) transmit an acoustic signal having one or more properties that identify the vehicle, and (ii) transmit an indication of a location of the vehicle to a server device; an optical fiber configured to transmit a light signal; an optical detector coupled to an endpoint of the optical fiber, wherein the optical detector is configured to detect a reflected light signal corresponding to at least a portion of the transmitted light signal that is reflected due to the acoustic signal; and the server device communicatively coupled to the optical detector, wherein the server device is configured to: receive an indication of the reflected light signal from the optical detector; analyze one or more properties of the reflected light signal to identify one or more properties of the acoustic signal and identify the vehicle that transmitted the acoustic signal; and determine a location of the optical fiber based on the location of the vehicle.

The system of example 1, wherein the one or more properties of the acoustic signal include at least one of: a frequency, an amplitude, or a phase of the acoustic signal.

The system of any of examples 1-2, wherein the one or more properties of the acoustic signal encode identification information for the vehicle.

The system of any of examples 1-3, wherein the acoustic signal is transmitted with a subsonic frequency.

The system of any of examples 1-4, wherein the server device is further configured to: determine a distance from the vehicle to the optical fiber based on attenuation in the reflected light signal; and determine the location of the optical fiber based on the location of the vehicle and the distance from the vehicle to the optical fiber.

The system of any of examples 1-5, wherein the computing device in the vehicle is further configured to transmit indications of locations of the vehicle and corresponding times at which the vehicle is at the locations to the server device, and the server device is further configured to: determine a time of the reflected light signal; and compare the time of the reflected light signals to the corresponding times at which the vehicle is at the locations to identify a matching time and corresponding location of the vehicle.

The system of any of examples 1-6, wherein the optical fiber is optically connected to an optical line terminal (OLT) in a passive optical network (PON), and wherein the optical fiber is configured to transmit the light signal from the OLT to an optical network terminal (ONT).

The system of any of examples 1-7, wherein the optical fiber is optically connected to the OLT via a port, and the server device is further configured to identify the optical fiber from which the reflected light signal is received based on the port from which the optical detector detects the reflected light signal.

The system of any of examples 1-8, wherein the computing device in the vehicle includes a plurality of computing devices in a plurality of vehicles each transmitting a different acoustic signal having different properties that identify the vehicle, wherein the optical fiber includes a plurality of optical fibers transmitting a plurality of light signals, and wherein the server device is further configured to: receive indications of a plurality of reflected light signals from the optical detector; for each of the plurality of reflected light signals: analyze one or more properties of the reflected light signal to identify one or more properties of the acoustic signal and identify one of the plurality of vehicles that transmitted the acoustic signal; determine the location of the optical fiber based on the location of the identified vehicle; and store indications of locations of each of the plurality of optical fibers.

A method for determining a location of an optical fiber, the method comprising: receiving, at a computing device via an optical detector optically coupled to an optical fiber, a reflected light signal having one or more properties, wherein the reflected light signal corresponds to a transmitted light signal via the optical fiber, and wherein at least a portion of the light signal is reflected due to an acoustic signal; analyzing, by the computing device, the one or more properties of the reflected light signal to identify one or more properties of the acoustic signal; comparing, by the computing device, the one or more properties of the acoustic signal to sounds transmitted by vehicles at known locations to identify a vehicle that transmitted the acoustic signal; and determining, by the computing device, a location of the optical fiber based on a known location of the identified vehicle.

The method of example 10, wherein the one or more properties of the acoustic signal include at least one of: a frequency, an amplitude, or a phase of the acoustic signal.

The method of any of examples 10-11, wherein the one or more properties of the acoustic signal encode identification information for the vehicle.

The method of any of examples 10-12, wherein the acoustic signal is transmitted with a subsonic frequency.

The method of any of examples 10-13, further comprising: determining, by the computing device, a distance from the identified vehicle to the optical fiber based on attenuation in the reflected light signal; and determining, by the computing device, the location of the optical fiber based on the known location of the identified vehicle and the distance from the identified vehicle to the optical fiber.

The method of any of examples 10-14, further comprising: determining, by the computing device, a time of the reflected light signal; and comparing, by the computing device, the time of the reflected light signal to corresponding times at which the identified vehicle is at the known locations to identify a matching time and corresponding known location of the vehicle.

A method for transmitting an acoustic signal to determine a location of an optical fiber, the method comprising: transmitting, by a computing device in a vehicle, an acoustic signal having one or more properties that identify the vehicle; determining, by the computing device, a location of the vehicle when the acoustic signal is transmitted; and transmitting, by the computing device, an indication of the location of the vehicle to a server device, wherein the acoustic signal reflects at least a portion of a light signal transmitted via an optical fiber for the server device to determine the location of the optical fiber based on the location of the vehicle according to one or more properties of the received portion of the light signal corresponding to the one or more properties of the acoustic signal that identify the vehicle.

The method of example 16, wherein the computing device is a mobile device, and transmitting the acoustic signal includes transmitting, by the mobile device, the acoustic signal to a speaker in a vehicle head unit that continuously emits the acoustic signal over a time period.

The method of any of examples 16-17, wherein the vehicle is an automobile or a drone.

The method of any of examples 16-18, wherein the one or more properties of the acoustic signal encode identification information for the vehicle.

The method of any of examples 16-19, wherein the acoustic signal is transmitted with a subsonic frequency.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system for determining a location of an optical fiber, the system comprising:
   a computing device in a vehicle configured to (i) transmit an acoustic signal having one or more properties that identify the vehicle, and (ii) transmit an indication of a location of the vehicle to a server device;
   an optical fiber configured to transmit a light signal;
   an optical detector coupled to an endpoint of the optical fiber, wherein the optical detector is configured to detect a reflected light signal corresponding to at least a portion of the transmitted light signal that is reflected due to the acoustic signal; and
   the server device communicatively coupled to the optical detector, wherein the server device is configured to:
      receive an indication of the reflected light signal from the optical detector;
      analyze one or more properties of the reflected light signal to identify one or more properties of the acoustic signal and identify the vehicle that transmitted the acoustic signal; and
      determine a location of the optical fiber based on the location of the vehicle.

2. The system of claim 1, wherein the one or more properties of the acoustic signal include at least one of: a frequency, an amplitude, or a phase of the acoustic signal.

3. The system of claim 2, wherein the one or more properties of the acoustic signal encode identification information for the vehicle.

4. The system of claim 2, wherein the acoustic signal is transmitted with a subsonic frequency.

5. The system of claim 1, wherein the server device is further configured to:
   determine a distance from the vehicle to the optical fiber based on attenuation in the reflected light signal; and
   determine the location of the optical fiber based on the location of the vehicle and the distance from the vehicle to the optical fiber.

6. The system of claim 1, wherein the computing device in the vehicle is further configured to transmit indications of locations of the vehicle and corresponding times at which the vehicle is at the locations to the server device, and the server device is further configured to:
   determine a time of the reflected light signal; and
   compare the time of the reflected light signals to the corresponding times at which the vehicle is at the locations to identify a matching time and corresponding location of the vehicle.

7. The system of claim 1, wherein the optical fiber is optically connected to an optical line terminal (OLT) in a passive optical network (PON), and wherein the optical fiber is configured to transmit the light signal from the OLT to an optical network terminal (ONT).

8. The system of claim 7, wherein the optical fiber is optically connected to the OLT via a port, and the server device is further configured to identify the optical fiber from which the reflected light signal is received based on the port from which the optical detector detects the reflected light signal.

9. The system of claim 1, wherein the computing device in the vehicle includes a plurality of computing devices in a plurality of vehicles each transmitting a different acoustic signal having different properties that identify the vehicle, wherein the optical fiber includes a plurality of optical fibers transmitting a plurality of light signals, and wherein the server device is further configured to:
   receive indications of a plurality of reflected light signals from the optical detector;
   for each of the plurality of reflected light signals:
      analyze one or more properties of the reflected light signal to identify one or more properties of the acoustic signal and identify one of the plurality of vehicles that transmitted the acoustic signal;
      determine the location of the optical fiber based on the location of the identified vehicle; and
   store indications of locations of each of the plurality of optical fibers.

10. A method for determining a location of an optical fiber, the method comprising:
- receiving, at a computing device via an optical detector optically coupled to an optical fiber, a reflected light signal having one or more properties, wherein the reflected light signal corresponds to a transmitted light signal via the optical fiber, and wherein at least a portion of the light signal is reflected due to an acoustic signal;
- analyzing, by the computing device, the one or more properties of the reflected light signal to identify one or more properties of the acoustic signal;
- comparing, by the computing device, the one or more properties of the acoustic signal to sounds transmitted by vehicles at known locations to identify a vehicle that transmitted the acoustic signal; and
- determining, by the computing device, a location of the optical fiber based on a known location of the identified vehicle.

11. The method of claim 10, wherein the one or more properties of the acoustic signal include at least one of: a frequency, an amplitude, or a phase of the acoustic signal.

12. The method of claim 11, wherein the one or more properties of the acoustic signal encode identification information for the vehicle.

13. The method of claim 11, wherein the acoustic signal is transmitted with a subsonic frequency.

14. The method of claim 10, further comprising:
- determining, by the computing device, a distance from the identified vehicle to the optical fiber based on attenuation in the reflected light signal; and
- determining, by the computing device, the location of the optical fiber based on the known location of the identified vehicle and the distance from the identified vehicle to the optical fiber.

15. The method of claim 10, further comprising:
- determining, by the computing device, a time of the reflected light signal; and
- comparing, by the computing device, the time of the reflected light signal to corresponding times at which the identified vehicle is at the known locations to identify a matching time and corresponding known location of the vehicle.

16. A method for transmitting an acoustic signal to determine a location of an optical fiber, the method comprising:
- transmitting, by a computing device in a vehicle, an acoustic signal having one or more properties that identify the vehicle;
- determining, by the computing device, a location of the vehicle when the acoustic signal is transmitted; and
- transmitting, by the computing device, an indication of the location of the vehicle to a server device,
- wherein the acoustic signal reflects at least a portion of a light signal transmitted via an optical fiber for the server device to determine the location of the optical fiber based on the location of the vehicle according to one or more properties of the received portion of the light signal corresponding to the one or more properties of the acoustic signal that identify the vehicle.

17. The method of claim 16, wherein the computing device is a mobile device, and transmitting the acoustic signal includes transmitting, by the mobile device, the acoustic signal to a speaker in a vehicle head unit that continuously emits the acoustic signal over a time period.

18. The method of claim 16, wherein the vehicle is an automobile or a drone.

19. The method of claim 16, wherein the one or more properties of the acoustic signal encode identification information for the vehicle.

20. The method of claim 16, wherein the acoustic signal is transmitted with a subsonic frequency.

* * * * *